(12) United States Patent
Kompella et al.

(10) Patent No.: US 8,687,629 B1
(45) Date of Patent: Apr. 1, 2014

(54) FABRIC VIRTUALIZATION FOR PACKET AND CIRCUIT SWITCHING

(75) Inventors: Kireeti Kompella, Los Altos, CA (US); Philip A. Thomas, San Jose, CA (US); Anurag Agrawal, Santa Clara, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 857 days.

(21) Appl. No.: 12/710,164

(22) Filed: Feb. 22, 2010

Related U.S. Application Data

(60) Provisional application No. 61/262,443, filed on Nov. 18, 2009.

(51) Int. Cl.
*H04L 12/50* (2006.01)
*H04L 12/28* (2006.01)
*H04L 12/26* (2006.01)
*H04L 12/56* (2011.01)

(52) U.S. Cl.
CPC ................................. *H04L 49/1515* (2013.01)
USPC ........... 370/388; 370/386; 370/387; 710/316; 710/317

(58) Field of Classification Search
CPC ...................................................... H04L 12/50
USPC .......... 379/242; 370/352–356, 386–388, 357; 710/316–317
See application file for complete search history.

(56) References Cited

U.S. PATENT DOCUMENTS

| | | | | |
|---|---|---|---|---|
| 5,251,206 | A * | 10/1993 | Calvignac et al. | 370/352 |
| 6,233,236 | B1 * | 5/2001 | Nelson et al. | 370/359 |
| 6,724,758 | B1 * | 4/2004 | Wright | 370/388 |
| 6,876,652 | B1 * | 4/2005 | Bell et al. | 370/386 |
| 7,242,686 | B1 * | 7/2007 | Dougherty et al. | 370/395.4 |
| 7,266,110 | B1 * | 9/2007 | Cao et al. | 370/352 |
| 7,356,025 | B2 * | 4/2008 | Bohm | 370/388 |
| 7,397,796 | B1 * | 7/2008 | Smiljani | 370/390 |
| 7,403,992 | B2 * | 7/2008 | Tilander et al. | 709/224 |
| 7,664,123 | B2 * | 2/2010 | Ashwood Smith et al. | 370/401 |
| 7,766,692 | B2 * | 8/2010 | Johnsen et al. | 439/488 |
| 8,098,677 | B1 * | 1/2012 | Pleshek et al. | 370/419 |
| 8,144,602 | B2 * | 3/2012 | Beyers | 370/242 |
| 8,254,390 | B2 * | 8/2012 | Hall et al. | 370/394 |

(Continued)

OTHER PUBLICATIONS

PowerPoint presentation by Kireeti Kompella entitled "Next Generation Transport: Evolution or Revolution?" Sep. 2009, 23 pp.

*Primary Examiner* — Asad Nawaz
*Assistant Examiner* — Wutchung Chu
(74) *Attorney, Agent, or Firm* — Shumaker & Sieffert, P.A.

(57) ABSTRACT

A network device includes a hybrid switch fabric configured for switching packets and circuits that includes a packet switching portion that distributes packets across a plurality of packet ports of fabric chips within the hybrid switch fabric and operates in accordance with packet switching behavior requirements, and a circuit switching portion for switching circuits, wherein the circuit switching portion of the hybrid switch fabric directly connects a single input of the hybrid switch fabric to a single output of the hybrid switch fabric via a pre-determined path through the fabric chips and operates in accordance with circuit switching behavior requirements. The packet switching portion and the circuit switching portion include one or more fabric chips, wherein the fabric chips each include a plurality of ports each dynamically configurable as one of a packet port for receiving and outputting packet-switched data and a circuit port for receiving and outputting circuit-switched data.

30 Claims, 7 Drawing Sheets

(56) References Cited

U.S. PATENT DOCUMENTS

| | | | |
|---|---|---|---|
| 8,339,985 B2 * | 12/2012 | So | 370/252 |
| 2002/0024951 A1 * | 2/2002 | Li | 370/392 |
| 2002/0048270 A1 * | 4/2002 | Allen et al. | 370/392 |
| 2005/0108444 A1 * | 5/2005 | Flauaus et al. | 710/15 |
| 2005/0117575 A1 * | 6/2005 | Konda | 370/389 |
| 2005/0195815 A1 * | 9/2005 | Chaudhuri | 370/389 |
| 2006/0013133 A1 * | 1/2006 | Peng et al. | 370/230 |
| 2007/0071014 A1 * | 3/2007 | Perera et al. | 370/396 |
| 2007/0121499 A1 * | 5/2007 | Pal et al. | 370/230 |
| 2007/0280223 A1 * | 12/2007 | Pan et al. | 370/360 |
| 2008/0044181 A1 | 2/2008 | Sindhu | |
| 2008/0056259 A1 * | 3/2008 | Miyamoto | 370/391 |
| 2008/0123674 A1 * | 5/2008 | Boduch et al. | 370/412 |
| 2009/0074414 A1 * | 3/2009 | Miles et al. | 398/75 |
| 2009/0080428 A1 * | 3/2009 | Witkowski et al. | 370/392 |
| 2010/0054260 A1 * | 3/2010 | Pandey et al. | 370/395.53 |
| 2010/0183003 A1 * | 7/2010 | Ryan et al. | 370/388 |
| 2010/0272117 A1 * | 10/2010 | Wu et al. | 370/413 |

\* cited by examiner

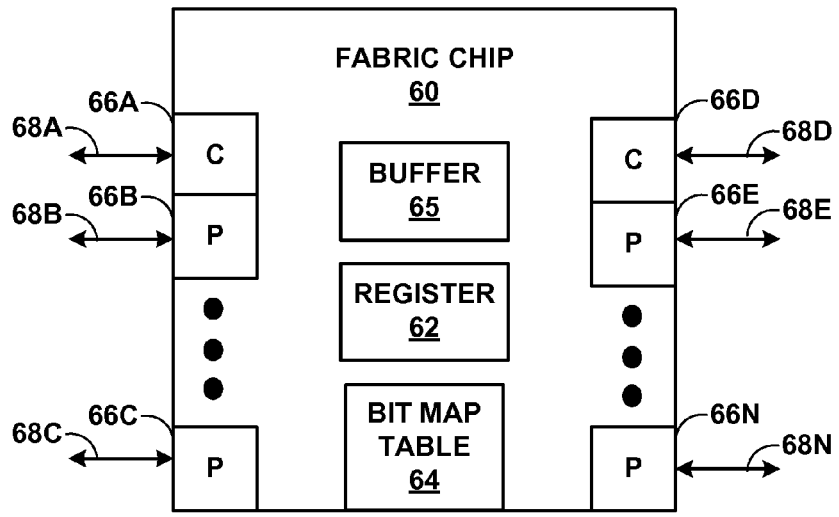
FIG. 5
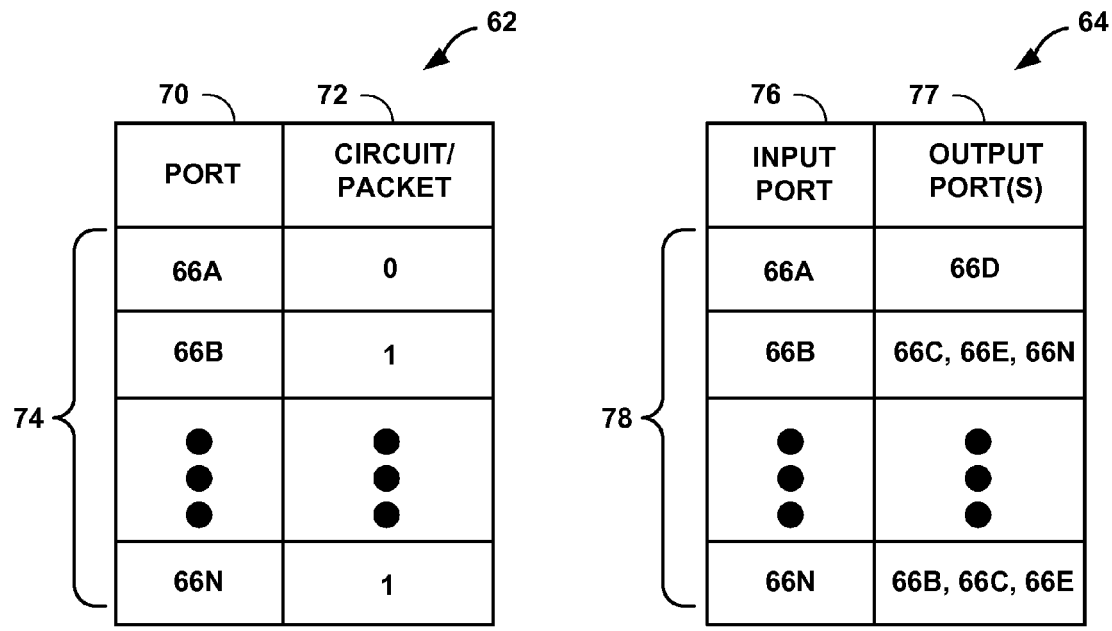
FIG. 6
FIG. 7

FABRIC VIRTUALIZATION FOR PACKET AND CIRCUIT SWITCHING

This application claims the benefit of U.S. Provisional Application No. 61/262,443, filed Nov. 18, 2009, the entire contents of which are incorporated by reference herein.

TECHNICAL FIELD

The invention relates to computer networks and, more particularly, to communicating packets within computer networks.

BACKGROUND

A computer network is a collection of interconnected computing devices that can exchange data and share resources. A physical connection between devices within the network is generally referred to as a link. In order to increase efficiencies, a single link may "channelized" to carry multiple data streams. Specifically, the available bandwidth of the link may be segmented into multiple channels. These channels may be further channelized into smaller channels, also referred to as sub-channels.

In a packet switching network, such as an Ethernet network, the computing devices communicate data by dividing the data into variable-length blocks called packets, which are individually routed across the network from a source device to a destination device. The destination device extracts the data from the packets and assembles the data into its original form. Computing devices that perform packet switching, such as high-speed routers or Ethernet switches, include switch fabrics that are configured specifically for the demands of packet switching, including high-speed packet switching. Multiplexing of multiple channels in packet switching networks allows for statistical multiplexing gain. Oversubscription of link bandwidth is permitted in packet switching networks. Packet queues may cause varying packet transfer delay, and such delay is tolerated and managed by the sending and receiving device as well as the intermediate routers and other devices of the packet switching network.

A circuit switching network is one that establishes a circuit between nodes before endpoints may communicate. Communication occurs across the circuit switching network as if the nodes were physically connected with a continuous, dedicated circuit from the source to the destination. Computing devices that perform circuit switching have switch fabrics that are configured specifically for circuit switching. In a circuit switching network, the delay variation for transmission of any data through the network across a given circuit is small (on the order of microseconds), as opposed to packet switching, which may experience packet transfer delay variation in the range of tens to hundreds of milliseconds. In this way, circuit switching networks guarantee bandwidth for any given circuit. However, circuit switching networks do not allow for oversubscription or forms of dynamic bandwidth allocation or dynamic re-channelization of a link such as statistical multiplexing gain. Examples of circuit switching devices include Synchronous Digital Hierarchy (SDH) signal cross-connect architectures that multiplex circuits at Synchronous Transport Signal-1 (STS-1) and higher, and Digital Cross-connect Systems (DACSs) that multiplex circuits below STS-1.

Due to their differences, some network environments implement both circuit switching devices and packet switching devices to handle different types of data communications. For example, a network service provider may deploy a set of devices to form a circuit-switched network for handling voice or other time-critical communications and a different set of devices to form a packet-switched network for data communications or other transmissions that may be less time-critical. This dual-network approach is costly to deploy and requires significant overhead to manage.

SUMMARY

In general, a network device is described having an internal, configurable switch fabric that can be virtualized or partitioned into a circuit-switched portion and packet-switched portion to accommodate the needs of the different types of traffic serviced by the network device. In particular, the techniques described herein allow a switch fabric of a network device, such as a high-speed router, to accommodate a configurable virtualization into two different types of switch fabric, a virtual packet fabric and a virtual circuit fabric although using the same physical switch fabric.

Separate internal cross-connects may be engineered within the fabric for carrying packets according to packet-switched behavior or for forming circuits for implementing circuit switching. The switch fabric may have multiple stages implemented by a set of fabric chips, and each port of a fabric chip can be configured as either a "packet port" or "circuit port." Once configured, the packet ports and circuit ports are logically mapped to each other across the fabric and operate according to different behavior, e.g., for purposes of flow control, multiplexing, buffering, or other transmission characteristics so as to correctly implement circuit-switched or packet-switched paths through the same, internal switch fabric of the network device. The result is a common switch fabric within the network device that provides the functionality and flexibility of multiple separate fabrics within different switching components, each having characteristics suitable for their respective tasks. Furthermore, the total bandwidth of the fabric matches the requirements of the external links on the device. Achieving a similar functionality with dedicated, single-purpose fabrics requires having two separate fabrics in the device, at a consequently higher cost.

In one embodiment, a cell-based Clos fabric of a network device is configured as a hybrid switch fabric that includes both a circuit fabric portion and a packet fabric portion. This provides a "soft" virtualization, in that the percentage of the fabric that is dedicated to packets and the percentage dedicated to circuits and/or other switching behaviors is easily configurable by an administrator, such as by a management interface of the network device. The cell-based Clos fabric may be implemented by one or more hardware components, e.g., fabric chips. The fabric may be, for example, a three-stage Clos fabric.

The techniques described herein may allow the "circuit" portion of the fabric to be protected from a surge in traffic in the "packet" portion of the fabric. For example, dedicated paths through the switch fabric can be configured for circuit traffic. This virtualized circuit-switched portion of the switch fabric can be protected from packet traffic in that, once configured, the paths are isolated from the packets that traverse the packet-switched portion even under high-congestion periods when packets may otherwise be dropped. For example, packet switching can be susceptible to surges in traffic, resulting in packet loss or delay. Regardless, even under such circumstances, the portion of the switch fabric configured for circuit switching remains unaffected and maintains a very low bit delay as required for each circuit.

The switch fabric may be considered a hybrid switch fabric that may be flexibly configured into a packet switching portion and a circuit switching portion. Moreover, once logically portioned into the two portions, the packet switching portion of the hybrid switch fabric provides the performance required for packet switching, such as by allowing for load balancing, oversubscription, statistical multiplexing, and other features that may be used for packet switching. The circuit switching portion of the hybrid switch fabric provides the performance required for circuit switching, i.e., by providing dedicated bandwidth, pre-provisioned cross-connects, and other features. In this manner, the hybrid switch fabric acts like two separate switch fabrics, each with characteristics and features specific to the needs of its respective traffic type. Despite this behavior, the hybrid switch fabric physically comprises a single, shared hybrid switch fabric in which a single switching topology can be logically configured into the two switching portions.

The techniques described herein may provide one or more advantages. For example, the techniques may allow network service providers to avoid deploying and managing separate, circuit switched networks and packet switched networks. Moreover, the network device described provides flexibility that allows a system administrator to easily reconfigure the device so as to change the allocation of switch fabric between the circuit switched and packet switched portions as the needs and requirements of the network evolve. Further, the techniques described herein provide fine-grain level of control in which the switch fabric and the network device can be logically partitioned on a per-port basis. That is, any physical interface card installed within the network device can be serviced by the switch fabric as either circuit switched or packet switched operation, thus providing the administrator with a high level of control and flexibility. Other techniques may be used for partitioning fabric ports into packet switched and circuit switched portions. For example, signaling techniques such as Generalized MPLS (GMPLS) may establish links on the network device as circuit switched, and this may in turn dedicate sufficient fabric ports to be designated as circuit switched to support the bandwidth required by the external links.

As another example, the network device described herein may be a multi-chassis router having a plurality of different routing nodes connected and configured so as to operate as a single, high-end router within a network. Incorporation of the techniques described herein may allows such a system to no longer require different routing and switching components for supporting circuit switching and packet switching. As a result, the use of a common hybrid switch fabric for transmitting communications using both packet switching and circuit switching between routing nodes of a multi-chassis router may reduce the overall fabric bandwidth, number of cables and length of cable necessary to implement the switch fabric interconnecting the routing nodes. As a result, the multi-chassis router may more easily be scaled to incorporate an increased number of routing nodes without reaching or exceeding any physical size limits within an environment in which the multi-chassis router is to be deployed.

In one embodiment, a network device includes a configurable hybrid switch fabric configured for switching packets and circuits, wherein the hybrid switch fabric includes a packet switching portion for switching packets, wherein the packet switching portion of the hybrid switch fabric distributes packets across any of a plurality of packet ports of fabric chips within the hybrid switch fabric and operates in accordance with packet switching behavior requirements, and a circuit switching portion for switching circuits, wherein the circuit switching portion of the hybrid switch fabric directly connects a single input of the hybrid switch fabric to a single output of the hybrid switch fabric via a pre-determined path through the fabric chips and operates in accordance with circuit switching behavior requirements. The packet switching portion and the circuit switching portion include one or more fabric chips, wherein the fabric chips each include a plurality of configurable ports that are each dynamically configurable as one of a packet port for receiving and outputting packet-switched data and a circuit port for receiving and outputting circuit-switched data. The network device includes a plurality of removable line cards communicatively coupled to the hybrid switch fabric, wherein the plurality of removable line cards includes one or more packet line cards for inputting and outputting packet-switched data to and from the hybrid switch fabric, and one or more circuit line cards for inputting and outputting circuit switched data to and from the hybrid switch fabric.

In another embodiment, a method includes receiving packet-switched data at first one of a plurality of removable line cards of a network device, wherein the first one of the plurality of removable line cards is designated as a packet line card for inputting and outputting packet-switched data to and from a configurable hybrid switch fabric of the network device, and receiving circuit-switched data at second one of the plurality of removable line cards of the network device, wherein the second one of the plurality of removable line cards is designated as a circuit line card for inputting and outputting circuit-switched data to and from the hybrid switch fabric. The method further includes sending the packet-switched data across a packet switching portion of the hybrid switch fabric, wherein the packet switching portion distributes packets across any of a plurality of packet ports of fabric chips within the hybrid switch fabric and operates in accordance with packet switching behavior requirements, and sending the circuit-switched data across a circuit switching portion of the hybrid switch fabric, wherein the circuit switching portion of the hybrid switch fabric directly connects a single input of the hybrid switch fabric to a single output of the hybrid switch fabric via a pre-determined path through the fabric chips and operates in accordance with circuit switching behavior requirements. The packet switching portion and the circuit switching portion include one or more fabric chips, wherein the fabric chips each include a plurality of configurable ports that are each dynamically configurable as one of a packet port for receiving and outputting packet-switched data and a circuit port for receiving and outputting circuit-switched data. The plurality of removable line cards are communicatively coupled to the hybrid switch fabric.

In another embodiment, a computer-readable storage medium comprises instructions for causing a programmable processor to receive packet-switched data at first one of a plurality of removable line cards of a network device, wherein the first one of the plurality of removable line cards is designated as a packet line card for inputting and outputting packet-switched data to and from a configurable hybrid switch fabric of the network device, and receive circuit-switched data at second one of the plurality of removable line cards of the network device, wherein the second one of the plurality of removable line cards is designated as a circuit line card for inputting and outputting circuit-switched data to and from the hybrid switch fabric. The medium further includes instructions for causing the programmable processor to send the packet-switched data across a packet switching portion of the hybrid switch fabric, wherein the packet switching portion distributes packets across any of a plurality of packet ports of fabric chips within the hybrid switch fabric and operates in accordance with packet switching behavior requirements, and send the circuit-switched data across a circuit switching portion of the hybrid switch fabric, wherein the circuit switching portion of the hybrid switch fabric directly connects a single input of the hybrid switch fabric to a single output of the hybrid switch fabric via a pre-determined path through the fabric chips and operates in accordance with circuit switching behavior requirements. The packet switching portion and the circuit switching portion include one or more fabric chips, wherein the fabric chips each include a plurality of configurable ports that are each dynamically configurable as one of a packet port for receiving and outputting packet-switched data and a circuit port for receiving and outputting circuit-switched data. The plurality of removable line cards are communicatively coupled to the hybrid switch fabric.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIG. 5 is a block diagram illustrating a detailed view of a fabric chip that may be positioned within a switch fabric.

FIG. 6 is a block diagram illustrating register of FIG. 5 in further detail.

FIG. 7 is a block diagram illustrating bit map table of FIG. 5 in further detail.

DETAILED DESCRIPTION

Figure 1:
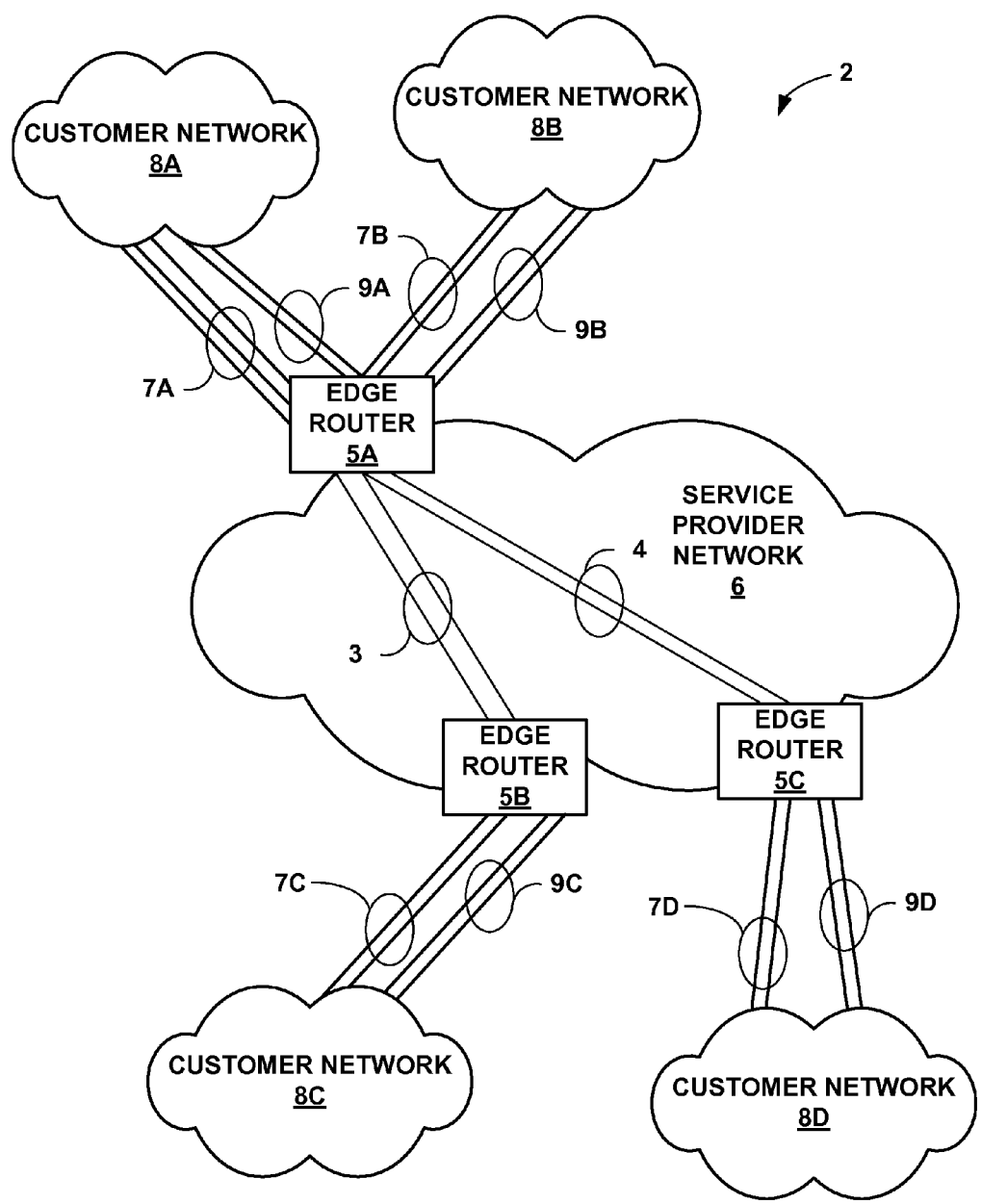
FIG. 1 is block diagram of an example computing environment in which a service provider network includes edge routers that may be configured for providing different switching behavior using a common switch fabric in accordance with the techniques described herein.

FIG. 1 is a block diagram illustrating an example system 2 in which each of edge routers 5A-5C ("edge routers 5") of service provider network 6 may be configured for providing different switching behavior using a common switch fabric in accordance with the techniques described herein. For example, each of edge routers 5 includes a switch fabric providing a switching topology that may be configured to perform both packet switching and circuit switching. In this example, edge routers 5 provide customer networks 8A-8D ("customer networks 8") with access to service provider network 6.

In the illustrated embodiment, edge router 5A is coupled to customer networks 8A and 8B via a plurality of access links 7A, 9A, and 7B, 9B, respectively. Edge router 5B is coupled to customer network 8C via access links 7C, 9C, and edge router 5C is coupled to customer network 8D via access links 7D, 9D. Access links 7A-7D may be links that carry circuit-switched traffic, and access links 9A-9D may be links that carry packet-switched traffic. Similarly, links 3 across service provider network 6 may carry circuit-switched traffic, and links 4 may be links that carry packet-switched traffic. Customer networks 8 may be, for example, networks for geographically separated sites of an enterprise. Each of customer networks 8 may include one or more computing devices (not shown). The configuration of network 2 illustrated in FIG. 1 is merely exemplary. For example, an enterprise may include any number of customer networks 8. Nonetheless, for ease of description, only customer networks 8A-8D are illustrated in FIG. 1.

Although not illustrated, service provider network 6 may be coupled to one or more networks administered by other providers, and may thus form part of a large-scale public network infrastructure, e.g., the Internet. Consequently, customer networks 8 may be viewed as edge networks of the Internet. Service provider network 6 may provide computing devices within customer networks 8 with access to the Internet, and may allow the computing devices within the customer networks to communicate with each other. Service provider network 6 may include a variety of network devices other than edge routers 5. Although additional network devices are not shown for ease of explanation, it should be understood that system 2 may comprise additional network and/or computing devices such as, for example, one or more additional switches, routers, hubs, gateways, security devices such as firewalls, intrusion detection, and/or intrusion prevention devices, servers, storage devices, computer terminals, laptops, printers, databases, wireless mobile devices such as cellular phones or personal digital assistants, wireless access points, bridges, cable modems, application accelerators, or other network devices. Moreover, although the elements of system 2 are illustrated as being directly coupled, it should be understood that one or more additional network elements may be included along any of links 3, 4, 9, and/or 7, such that the network elements of system 2 are not directly coupled.

Consistent with the techniques described herein, each of edge routers 5 may be a single-chassis router having a central switch fabric or a multi-chassis router having a distributed switch fabric. In the example of a single-chassis router, an edge router such as edge router 5A performs both packet switching and circuit switching on a data plane of edge router 5A using a common switch fabric. Individual ports or links associated with one or more fabric chips (not shown) internal to the switch fabric are logically designated for forwarding either packet data or circuit data. This logical designation is dynamically configurable, and provides a virtualization of the common switch fabric as separate switch fabrics for packet switching and circuit switching even though a single switch fabric is used. As described in further detail below, the percentage of the internal switch fabric that is designated for packet switching and circuit switching is dynamically configurable.

In the example of a multi-chassis router, an edge router such as edge router 5A includes multiple routing nodes (not shown in FIG. 1) that are physically coupled and configured to operate as a single routing node. That is, to peer edge routers 5B, 5C of network environment 2, edge router 5A appears as a single routing device. For example, although edge router 5A includes a plurality routing nodes, from the perspective of peer routers 5, the multi-chassis edge router 5A has a single network address and maintains single peer routing sessions for each routing protocol maintaining peer routing sessions with each of the edge routers 5.

As described in further detail below, when edge router 5A is a multi-chassis router, the multiple routing nodes of edge router 5A forward packet data or circuit data, i.e., network traffic, on a data plane of edge router 5A using a common switch fabric. As with the single-chassis router example, the fabric links may be designated as packet links or circuit links, for example, and this results in the appearance of two separate, dedicated switch fabrics, when in fact only a single, common switch fabric is required. Data plane and control plane communications between the multiple routing nodes of edge router 5A may occur using multiplexed optical interconnects or by other means. Edge router 5A may include a multi-stage switch fabric, such as a 3-stage Clos switch fabric, that relays packet-switched communications and circuit-switched communications between the routing nodes via optical interconnects using multiplexed communications. Such a multi-chassis router that employs optical interconnects using multiplexed communications is described in U.S. Publication No. 2008/0044181, entitled MULTI-CHASSIS ROUTER WITH MULTIPLEXED OPTICAL INTERCONNECTS, filed on Aug. 1, 2007, the entire contents of which are incorporated by reference herein.

In one example configuration, the stages of the common switch fabric may be distributed among the individual routing nodes of the multi-chassis router in a decentralized manner. For example, the multi-chassis router may include a plurality of line card chassis (LCCs) that cooperate so as to operate as a single router within a network. Implementation of the multi-stage switch fabric may be distributed to the LCCs, and the LCCs may communicate using multiplexed communications. Alternatively, one or more central switch nodes, such as a switch control chassis (SCC), may be incorporated within the multi-chassis router. In either case, use of a common switch fabric for transmitting communications using both packet switching and circuit switching between the routing nodes may provide certain advantages. For example, use of the common switch fabric may reduce the overall length of cable necessary to implement the switch fabric interconnecting the nodes. Moreover, the common switch fabric may reduce the number of cable interfaces required on each routing node. As a result, edge router 5A may more easily be scaled to incorporate an increased number of routing nodes without reaching or exceeding any physical size limits within an environment in which the multi-chassis router is to be deployed.

In the context of this disclosure, the term "router" is used to describe a device that can perform both packet switching and circuit switching. Although discussed primarily with respect to routers, the techniques of this disclosure may be implemented by other network devices as well. For example, switches may implement the techniques of this disclosure in some examples to improve Layer Two (that is, Data Link Layer) functionality of the switches. In some examples, the techniques of this disclosure may be implemented by Ethernet switches. Although the example of FIG. 1 is described with respect to edge routers, the techniques of this disclosure may likewise be implemented by core routers or core switches.

Figure 2:
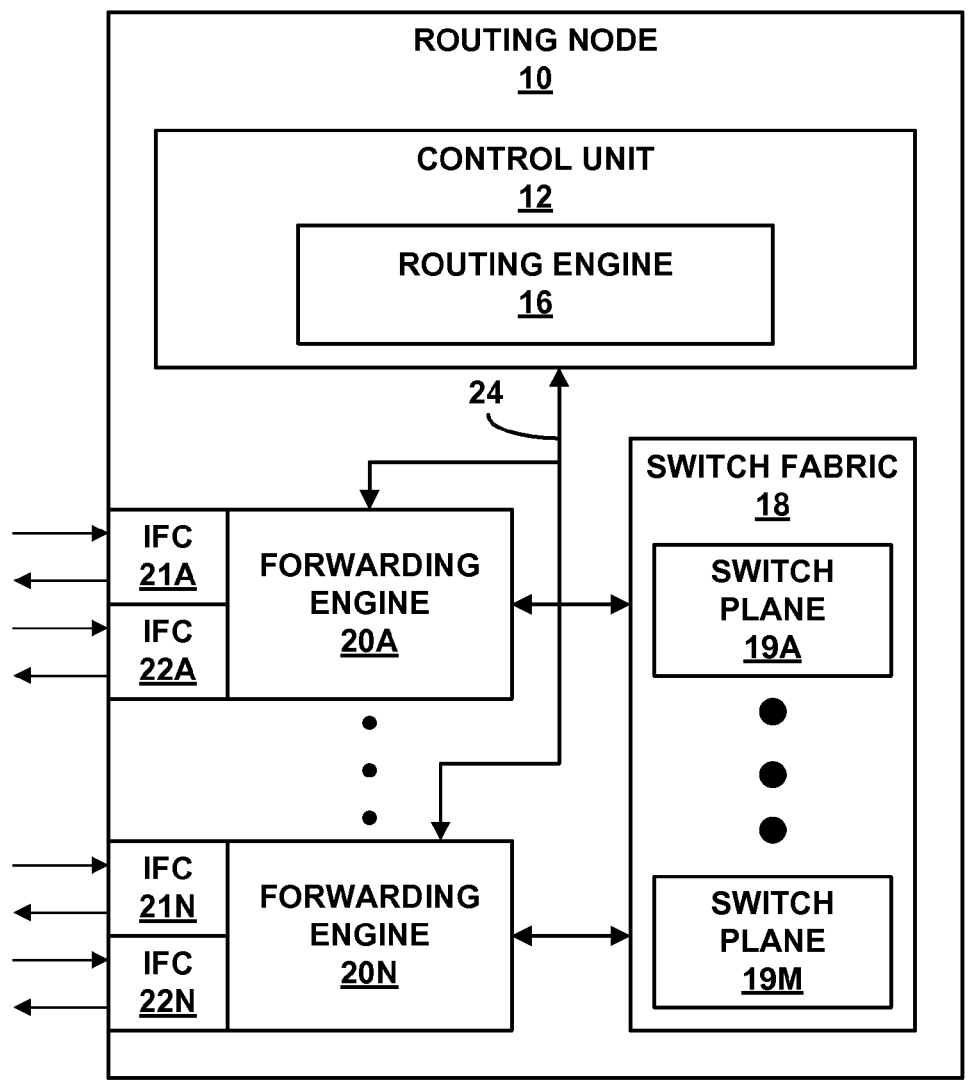
FIG. 2 is a block diagram illustrating an exemplary single-chassis router having a switch fabric as described herein.

FIG. 2 is a block diagram illustrating an example standalone routing node 10 that includes a single switch fabric 18 capable of implementing multiple types of data transmission, including both packet switching and circuit switching functions. In this example, standalone routing node 10 includes a control unit 12 that includes a routing engine 16. Standalone router 10 also includes forwarding engines 20A through 20N ("FEs 20") and a switch fabric 18. FEs 20 may receive and send data via interface cards 21A through 21N ("IFCs 21") and IFCs 22A through 22N ("IFCs 22"). In one example, IFCs 21 may be designated for receiving and sending packet-switched communications, and IFCs 22 may be designated for receiving and sending circuit-switched communications. In other embodiments, each of FEs 20 may comprise more or fewer IFCs. Switch fabric 18 provides an interconnect mechanism for forwarding data between FEs 20 for transmission over a network, e.g., the Internet.

Routing engine 16 maintains routing tables, executes routing protocols and controls user access to standalone routing node 10. In this example, routing engine 16 is connected to each of FEs 20 by a dedicated link 24, with may be an internal Ethernet link. For example, dedicated link 24 may comprise a 100 Mbps Ethernet connection. Routing engine 16 maintains routing information that describes a topology of a network, and derives a forwarding information base (FIB) in accordance with the routing information. Routing engine 16 copies the FIB to each of FEs 20. This allows the FIB in each of FEs 20 to be updated without degrading packet forwarding performance of standalone router 10. Alternatively, routing engine 16 may drive separate FIBs which are copied to respective FEs 20.

In a routing node, a "switch plane" is generally capable of providing a communication path between any two of FEs 20. In this example, switch fabric 18 consists of multiple standalone switch planes 19A through 19M ("switch planes 19"). In some embodiments, each of switch planes 19 is provided by one or more switch fabric chips on one or more separate, removable switch cards. Other routing nodes that implement the techniques described herein may comprise additional or fewer switch planes, including a single switch plane. A majority of the switch planes, e.g., switch planes 19A-19D, may be active at any given time with data packets distributed over the active switch planes. The inactive switch plane(s) of switch fabric 18 serves as back-up switch plane(s) such that if one or more of the active switch planes goes offline, the back-up switch plane(s) automatically activate, and the bandwidth capacity of standalone router 10 is not diminished. The back-up switch plane(s) may be identical to the active switch planes and act as hot spare(s) to maintain bandwidth capacity in the event that one or more of the active switch planes fail. Each of switch planes 19 is operationally independent; therefore, standalone routing node 10 may continue to forward packets as long as at least one of switch planes 19 remain active, but possibly at a reduced bandwidth capacity.

As part of a standalone router, switch planes 19 form a standalone switch fabric 18. That is, each of switch planes 19 is capable of providing a connection between any of FEs 20 within standalone routing node 10. In this manner, switch planes 19 form a standalone switch fabric that enables packet forwarding between the plurality of FEs 20 of standalone routing node 10. For example, switch fabric 18 may be provided by a set of removable switch cards, where each removable switch card provides a respective one of switch planes 19.

In accordance with the techniques described herein, routing node 10 may be configured to implement packet switching and circuit switching. In some embodiments, each of FEs 20 can be designated as "packet FEs" or "circuit FEs," such that the designated FEs 20 will receive and send only packet-switched communications or only circuit-switched communications, respectively. In other embodiments, any of FEs 20 may operate to forward data over any combination of packet-based connections or circuits depending upon the configuration of the IFCs 21, 22. Individual ports associated with switch fabric chips of switch planes 19 may also be designated for packet switching or circuit switching, as described in further detail below. More specifically, switch fabric 18 may be programmably configured into two different types of switch fabric, a virtual packet fabric implementing packet switching behavior and a virtual circuit fabric implementing circuit switching behavior using the same physical switch fabric. Switch fabric 18 is logically partitioned into two portions, where each portion provides distinct switching behavior and characteristics to comply with the requirements of circuit switched networks or packet switch networks. In other words, the configurable partitioning results in the appearance of two separate, dedicated switch fabrics within routing node 10, when in fact only a single, common switch fabric is used.

An example flow-path of data packets through standalone routing node 10 is as follows. Initially, an incoming data packet is received by one of packet IFCs 21, e.g., IFC 21A, having a network interface for receiving data packets from a packet-based network link, such as an Ethernet link. Interfaces on IFC 21A send packet data, such as a packet header, to a lookup module of FE 20A for processing. The lookup module (not shown) determines a destination address, multicast forwarding tuple, or other keying information of the packet from the packet data and queries a forwarding information base (FIB) for a forwarding entry matching the keying information. A matching entry specifies the appropriate next hop interface for the packet. FE 20A stores the packet for future processing in an input buffer. The input buffer is typically a form of dynamic RAM (e.g., DRAM, SDRAM, DDR2, RLDRAM, and the like) but may be another type of storage media. In some embodiments, the input buffer is shared among the various FEs 20 of routing node 10 as distributed buffer memory. In some embodiments, interfaces of IFCs 21 are implemented as high-speed, on-chip memory within one or more forwarding integrated circuits, and the input buffer is provided by off-chip DDR2 coupled to the forwarding integrated circuits by a data bus.

The input buffer stores network packets received by IFC 21A, that is, those packets for which FE 20A is the ingress one of FEs 20. As a result, packets stored in FE 20A are input queued and wait for scheduling to be switched across switch fabric 18 to the appropriate one or more egress FEs 20. The input buffer may provide a variable-size buffer for each destination.

In this example, FE 20A segments the inbound data packet into multiple cells, e.g., into sixty-four-byte data cells. FE 20A may mark the cells with an indication that the cells are "packet" cells, e.g., by setting a special data bit in a cell header. The cell header may also indicate a priority of an associated packet, for purposes of flow control within the switch fabric. FE 20A selects a queue for enqueuing the packet based on the next hop interface determined by the lookup module. FE 20A performs flow control for packet switching communications, e.g., by sending a request through switch fabric 18 to the egress FE 20 for sending the number of cells corresponding to the packet. The egress FE 20 may respond with a grant. Upon receiving the grant, FE 20A dequeues the packet cells and transfers the cells of the packet across the active switch planes to the correct egress FE. During this process, the active switch planes having fabric chips with ports designated for packet switching will forward the packet cells to the egress FE. When the packet cells arrive at the egress FE, e.g., FE 20N, they are written into egress memory and reassembled into the original packet. The data packet is then transmitted into the network (not shown) via one of IFCs 21 or 22, e.g., IFC 21N. By dividing the data packet into cells and evenly transmitting the packet on a cell-by-cell basis across the switch planes, a FE may load-balanced the packet-based traffic across each of the active switch planes having interconnects currently configured for packet-based switching.

An example flow-path of circuit switched data through standalone routing node 10 is as follows. When the circuit connection is initially established (e.g., by way of configuration data), an amount of requested bandwidth is pre-provisioned through the switch fabric 18 along a defined switch path from the ingress FE to the egress FE. Next, upon receiving data arriving upon a circuit-based interface, e.g., IFC 22A, ingress FE 20A may send certain data, such as a header, to the lookup module of FE 20A for processing. The lookup module may determine a FE at an egress of the pre-defined switch path through switch fabric 18. In some embodiments, FE 20A stores the data arriving on the circuit-based interface to an input buffer, although the size of the input buffer for data arriving on the circuit-based interface may be different from that allotted for packet data, and may be fixed-size buffers. FE 20A may transfer data from the fixed-size buffers onto switch fabric 18 at a constant bit rate. In other embodiments, FE 20A bypasses the step of storing the data arriving on the circuit-based interface to an input buffer, and instead immediately proceeds to segment the data into multiple circuit cells and outputs the circuit cells onto switch fabric 18 at a constant bit rate. In contrast to the treatment of packet-switched data described above, flow control may not be performed by FEs 20 and switch fabric 18 for data arriving upon a circuit-based interface.

In some embodiments, the circuit cells may have the same size and a similar format to that of the packet cells carried internally by switch fabric 18. The ingress FE may mark the circuit cell with an indication that the cell is a circuit cell, e.g., by setting a special data bit in a cell header, to indicate to switch fabric 18 that circuit switching behavior is to be strictly complied with when forwarding the circuit cells. For example, rather than queuing and load balancing the circuit cells across all of the active switch planes, the circuit cells for a particular connection are sent along a single cross-connect between the ingress and egress FEs having the provisioned bandwidth. Alternatively, in other example aspects, the circuit cells may be distributed across multiple circuit ports toward the egress FE.

Control unit 12 may be implemented solely in software, or hardware, or may be implemented as combinations of software, hardware, or firmware. For example, control unit 12 may include one or more processors which execute software instructions. For example, control unit 12 may comprise a processor, such as one or more programmable processors, microprocessors, application specific integrated circuits, field programmable gate arrays, digital signal processors, or other equivalent integrated or discrete logic circuitry. Control unit 12 may comprise one or more processors that execute software instructions, such as those used to define a software or computer program, stored to a computer-readable storage medium, such as a storage device (e.g., a disk drive, or an optical drive), or memory (e.g., a Flash memory, random access memory, or RAM) or any other type of volatile or non-volatile memory that stores instructions (e.g., in the form of a computer program or other executable) to cause a programmable processor to perform the techniques described herein. Alternatively, control unit 34 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), one or more Digital Signal Processors (DSPs) or any combination of the foregoing examples of dedicated hardware, for performing the techniques described herein.

Figure 3:
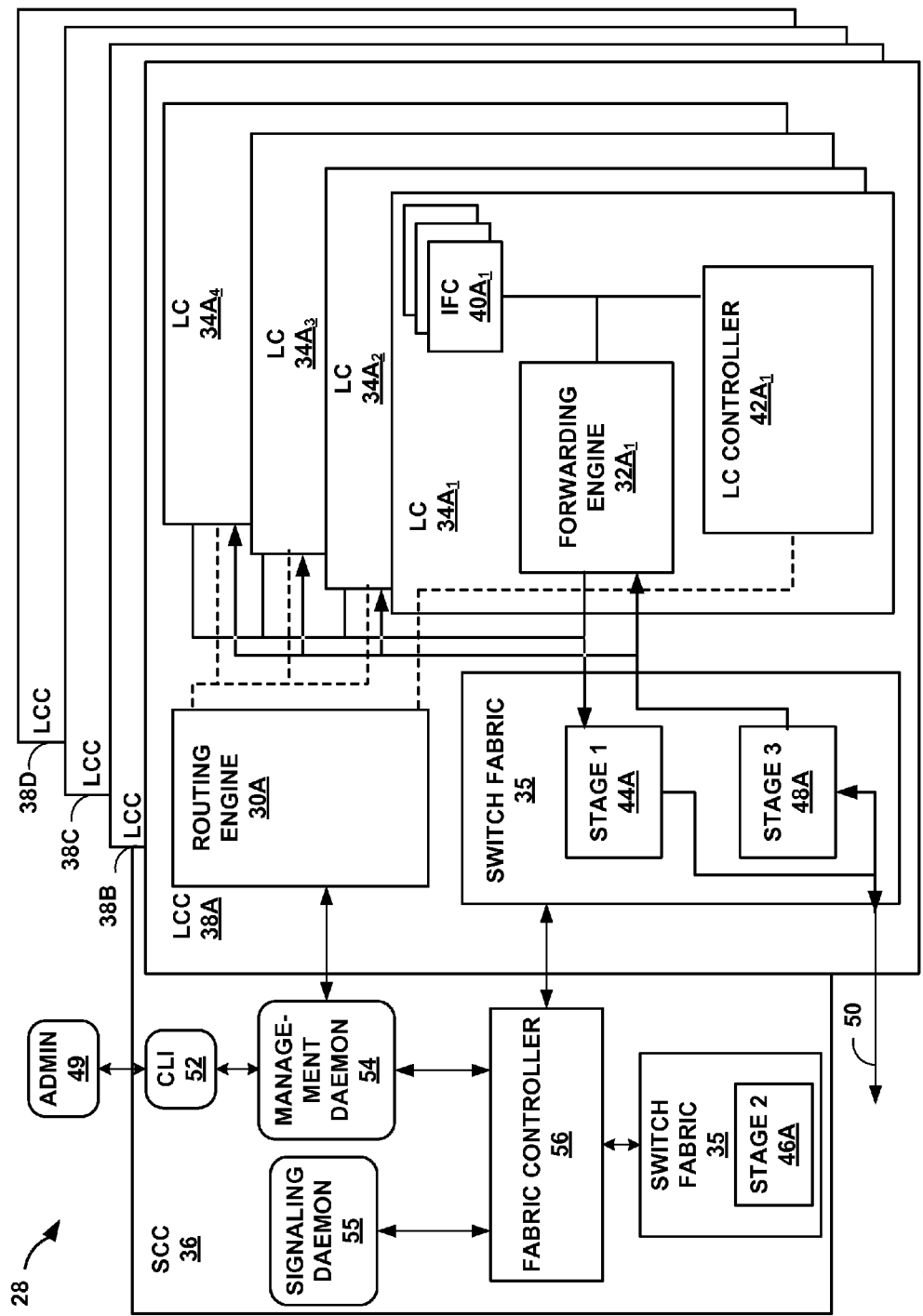
FIG. 3 is a block diagram illustrating in further detail a multi-chassis router having an exemplary line card chassis having a routing engine and a plurality of line cards.

FIG. 3 is a block diagram of an exemplary multi-chassis router 28 including a detailed view of a line card chassis (LCC) 38A, which represents one routing node of the multi-chassis router. Multi-chassis router 28 routes data between network devices across a network. Multi-chassis router 28 may, for example, represent an illustration of any of edge routers 5 of FIG. 1 in further detail.

As shown in FIG. 3, multi-chassis router 28 includes a plurality of cooperative routing components operating as a single node within the network. In this example, multi-chassis router 28 comprises four substantially identical LCCs 38B-38D ("LCCs 38") and a switch card chassis (SCC) 36. In other embodiments, a multi-chassis router may include more or fewer LCCs. SCC 36 may operate as a central routing node to connect the LCCs 38.

Each of LCCs 38 may be contained within a physically separate chassis and may include a routing engine (only routing engine 30A of LCC 38A is shown), switch fabric (only switch fabric 35 of LCC 38A is shown), a FE set (only FE 32A of LCC 38A is shown), and a set of network interfaces (not shown). SCC 36 comprises a centralized routing engine (not shown) connected to each of the routing engines of the LCCs 38 via links (not shown).

The other routing nodes, i.e., LCCs 38B-38D, are typically similar to LCC 38A. In this example, LCC 38A includes routing engine 30A and four line cards (LCs) $34A_1$-$34A_4$ ("LCs 34A"). Each LC 34A within LCC 38A includes a forwarding engine (FE) 32A. Each LC 34A further comprises a set of interface cards (IFCs) 40A that provide physical interfaces for receiving and sending packet-based data and/or circuit-based data to an external network. LCs 34A each also include an LC controller 42A that performs control functions within an LC 34A according to instructions from routing engine 30A.

LCCs 38 are substantially similar to standalone routing node 10 (FIG. 2), except that switch fabric 18 (FIG. 2), which comprises switch planes 19, has been replaced by one of switch fabrics 35, each consisting of multiple multi-chassis switch cards. In standalone routing node 10, each of switch planes 19 contains a standalone switch plane; while in multi-chassis router 28, each switch plane may be viewed as a multi-stage switch-plane that is distributed over a multi-chassis switch card from each of LCC switch fabrics 35 and an SCC switch card from SCC switch fabric 35.

In other words, each multi-chassis switch card in switch fabrics 35 performs the beginning and final stages in a multi-stage switching network. For example, multi-chassis cards in switch fabrics 35 of LCCs 38 may perform the first and third stages, while switch cards in switch fabric 35 of SCC 36 perform the second stage of a three-stage network. Together, one multi-chassis switch card from each of LCCs 38 and one SCC switch card from SCC 36 form a switch plane. For example, SCC switch fabric 35 and LCC switch fabrics 35 may form a total of five independent switch planes. In this manner, multi-chassis router 28 may comprise five independent switch planes, each one providing a multi-stage switched interconnect for forwarding packet cells between FEs 32. As with switch fabric 18 (FIG. 2), multi-chassis router 28 may consist of multiple active switch planes and additional redundant switch plane(s) to serve as hot spares. For example, multi-chassis router 28 may consist of four active switch planes and one redundant switch plane.

In this embodiment, each multi-chassis switch card in LCC switch fabrics 35 is connected to a single switch card in SCC switch fabric 35. A separate link connects each SCC switch card to each multi-chassis switch card. For example, links (not shown) may consist of five fiber-optic array cables. If multi-chassis router 28 has five switch planes, for example, a total of twenty cables may be used to connect switch fabrics 35.

Each FE set 32 can include multiple FEs. For example each FE set 32 may include eight FEs. Each FE in FE sets 32 may connect to one or more network interfaces. For example, a FE may send and receive information packets for two network interfaces, e.g., IFCs 21A and 22A from FIG. 2. An LCC 38 containing sixteen FEs with two network interfaces per FE would have a total of thirty-two network interfaces. Because multi-chassis router 28 comprises four LCCs, in this example, multi-chassis router 28 would have a total of one-hundred-twenty-eight network interfaces.

A routing engine of SCC 36 (not shown) maintains routing information that describes a topology of a network, and derives a forwarding information base (FIB) in accordance with the routing information. The routing engine of SCC 36 copies the FIB to each routing engine of the LCCS 38, e.g., to routing engine 30A of LCC 38A. Routing engine 30A then copies the FIB to FEs 32 on the chassis of LCC 38A. An ingress FE (any of FEs 32) uses the FIB to direct data arriving from the network (not shown) to the proper egress FE (also any FE from FEs 32). The egress FE relays the data to the network. The FIB in each of FEs 32 may be updated without degrading packet forwarding performance of multi-chassis router 28 because FIB updates are distributed separately from the data packets. Alternatively, the routing engine of SCC 36 may derive separate FIBs which are copied to respective FEs 32.

Each of FEs 32 is connected to all five switch planes of switch fabrics 35. Each active switch plane is responsible for providing a portion of the required bandwidth of multi-chassis router 28. By dividing the data into cells and transmitting the data on a cell-by-cell basis over the active switch planes, FEs 32 may load-balance traffic across the active switch planes of switch fabrics 35.

In accordance with the techniques described herein, multi-chassis router 28 is configured so as to perform packet switching and circuit switching of data using a common. configurable switch topology composed of switch fabrics 35. As described in further detail below, individual ports provided internally by fabric chips or internal links between fabric chips within switch fabric 35 may be designated as either packet ports/links or circuit ports/chips. This allows switch fabric 35 to be logically partitioned into two portions, where each portion provides distinct switching behavior and characteristics to comply with the requirements of circuit switched networks or packet switch networks. In other words, the configurable partitioning results in the appearance of two separate, dedicated switch fabrics within router 28, when in fact only a single, common switch fabric is used. Although described for purposes of example with respect to two types of switching behaviors (packet switching and circuit switching), the techniques may readily be applied to more than two types of switching technologies.

LCs 34A can be flexibly configured by an administrator 49 with a designation of whether the LCs 34A will handle packet switching or whether the LCs 34A will handle circuit switching. That is, the LCs 34A may be designated as "packet" line cards or "circuit" line cards, but this designation may be modified by an administrator 49 as needs change. Line card slots of LCCs 38 are therefore not permanently restricted to only packet or only circuit line cards, providing a more flexible network device.

In some aspects the administrator defines a plurality of data channels for a line card. The techniques described herein allow the administrator to distinguish, on a per-channel basis, between packet-switched communications and circuit-switched communications. For example, on a 4 Gigabyte channel, 1 Gigabyte may be defined for carrying packet-switched communications and 3 Gigabytes may be defined for carrying circuit-switched communications.

In one embodiment, administrator 49 ("ADMIN 49") interacts with management daemon 54 of SCC 36 via a command line interface (CLI) 52 to perform various management tasks using management daemon 54. In one example, the administrator 49 may configure LCs 34A as "packet" line cards or "circuit" line cards. In some embodiments, LCs 34 may be configured as hybrid line cards that may handle both packet switching and circuit switching, and may be configured on an interface-by-interface basis to perform either packet switching or circuit switching. The administrator 49 may also configure individual ports on fabric chips (not shown) of switch fabric 35 as either "packet" ports or "circuit" ports. In addition, administrator 49 may configure multi-chassis router 28 with configuration data to associate a first port on a circuit line card with a second port on a circuit line card (which may be the same or different circuit line card that contains the first port), for purposes of incoming and outgoing circuit traffic. That is, the administrator 49 can designate that circuit-switched data received on one port of a line card are output on a second port of a line card. In response to receiving the configuration data from administrator 49, management daemon 54 determines which circuit ports of fabric cards within the stages of switch fabric 35 will be associated with each other in order to transmit the packets from the ingress line card to the egress line card. Administrator 49 may send/receive data to/from one or more of a display, keyboard, mouse, stylus, touchscreen, or other interface for presenting and receiving data to/from administrator 49.

Management daemon 54 provides configuration information for configuring switch fabric 35 to fabric controller 56. Fabric controller 56 configures the individual fabric chips of switch fabric 35, as described in further detail below. For example, fabric controller 56 may modify a register and a bit map table of each fabric chip to configure the ports of the fabric chip as either packet ports or circuit ports.

As an example, administrator 49 may enter configuration data that indicates that a connection should be set up through router 28 that connects a ten Gigabit port on a first circuit line card, e.g., LC $34A_1$, to a ten Gigabit port on a second circuit line card, e.g., LC $34A_3$. Management daemon 54 automatically determines which individual fabric chip ports within switch fabric 35 will be tied to which fabric chip ports to carry out this connection through the switch fabric 35. Management daemon 54 invokes fabric controller 56, which then programs the fabric chips of switch fabric 35 to carry out the determination of management daemon 54. Management daemon 54 may provide a graphical representation via a display to administrator 49 of the associations among the ports of the fabric cards within switch fabric 35.

In another embodiment, signaling daemon 55 may receive signaling information via a signaling protocol for configuring the ports as packet ports or circuit ports, and/or for configuring the line cards as circuit line cards or packet line cards. As one example, the signaling protocol may be Generalized Multiprotocol Label Switching (GMPLS) protocol signaling. As one example, signaling daemon 55 may designate external links on router 28 as circuit switched, and this may in turn dedicate sufficient fabric ports to be designated as circuit switched to support the bandwidth required by the external links. Signaling daemon 55 may provide configuration information for configuring switch fabric 35 to fabric controller 56. This configuration by signaling may occur in the alternative to or in conjunction with the configuration via management daemon described above.

When one of IFCs $40A_1$ on LC $34A_1$ receives an incoming packet-based or circuit-based data, the IFC $40A_1$ forwards the incoming packet-based or circuit-based data to FE $32A_1$. FE $32A_1$ determines if the incoming packet-based or circuit-based data has a destination that requires the packet-based or circuit-based data to be forwarded to one of IFCs $40A_1$ of LCC 38A or a destination that requires the packet-based or circuit-based data to be forwarded to another IFC within multi-chassis router 28 according to a FIB provided by routing engine 30A. If the incoming packet-based or circuit-based data is to be output by any of IFCs $40A_1$ of LCC 38A, FE $32A_1$ forwards the packet-based or circuit-based data to the appropriate one of IFCs $40A_1$. If not, FE $32A_1$ segments the packet-based or circuit-based data into data cells and forwards the data cells to switch fabric portion 35 of LCC 38A for relaying to a different LCC 38 via the interconnect 50. In one example, interconnect 50 may comprise a plurality of multiplexed optical interconnects.

In some embodiments, the size of data cells used by FEs 32 for segmenting packet-based data may be the same as for segmenting circuit-based data, e.g., sixty-four-byte data cells. The data is written into ingress memory, and the ingress FE performs a FIB lookup. Using an active route from the FIB provided by routing engine 30, the ingress one of FEs 32 transfers the to an egress FE using switch fabric 35. When the data cells arrive at an egress one of FEs 32, they are written into egress memory and reassembled into the original packet or data unit. The reassembled packet or data unit is then transmitted via the corresponding one of IFCs 40.

In the example of FIG. 3, switch fabric portions 35 residing on LCCs 38B-38D and SCC 36 form a three-stage switch fabric. For example, the three-stage switch fabric may be a Clos network including multiple crossbar switches in each stage. In some embodiments, each of LCCs 38A-38D (LCCs 38) includes a portion of each of the three stages. In other embodiments, multi-chassis cards in switch fabrics 35 of LCCs 38 may perform the first and third stages, while switch cards in switch fabric 35 of SCC 36 perform the second stage of a three-stage network. As shown on switch fabric portion 35 of LCC 38A, data cells to be relayed from LC $34A_1$ are first sent to stage 1 switch 44A for transmission to a stage 2 switch. Stage 1 switch 44A may be a crossbar switch or other switch. In other embodiments, the portion of the stage 1 on LCC 38A may comprise more than one crossbar switch. The other N−1 portions of stage 1 of the switch fabric are similarly located on LCCs 38B-38D.

Once received by stage 1 switch 44A, a data cell is directed to the second stage of the switch fabric of multi-chassis router 28. For example, the data cell may be directed to stage 2 switch 46A, which is located internal to switch fabric portion 35 of SCC 36, in which case the data cell is relayed via interconnect 50.

As shown in FIG. 3, stage 2 switch 46A not only receives data cells from switch 44A, but also from similar stage 1 switches located on LCCs 38B-38D. Data cells from portions of stage 1 located on LCCs 38B-38D are received via interconnect 50, e.g., via fiber optic cables by a plurality of inputs (not shown). Data cells received at stage 2 switch 46A are relayed to stage 3 switches located on LCCs 38B-38D.

Stage 3 switch 48A includes discrete outputs (not shown) connecting to each of FEs 32A on LCs 34A. A cell received by stage 3 switch 48A is directed to the FE 32A corresponding to the set of IFCs 40A as required by the destination of the data unit. For example, if a cell is received by FE 32A$_1$, FE 32A$_1$ forwards the packet or data unit to one of the set of IFCs 40A$_1$ according to the destination of the packet or data unit.

Figure 4:
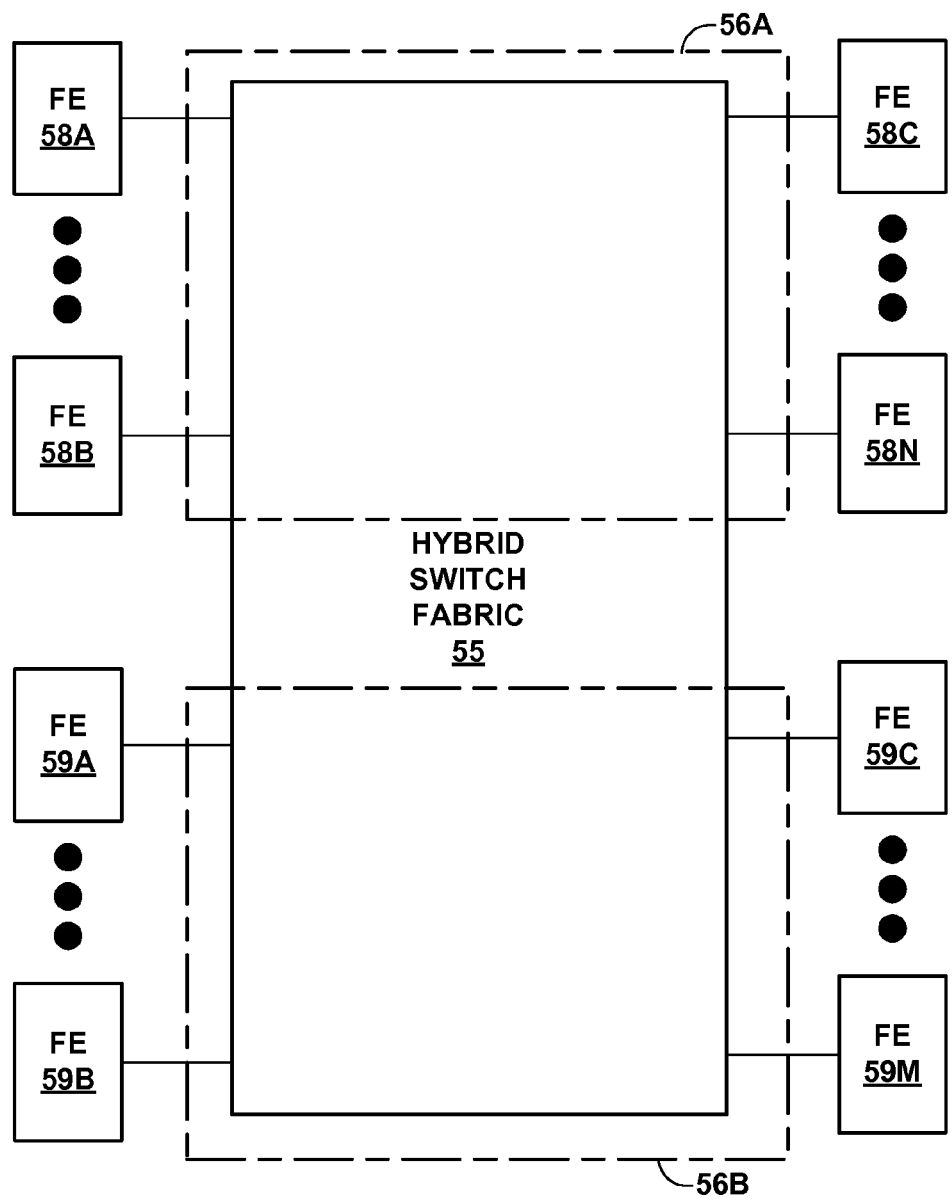
FIG. 4 is a block diagram illustrating a conceptual diagram of a portion of a router that includes a hybrid switch fabric having a packet switching portion and a circuit switching portion.
Figure 8:
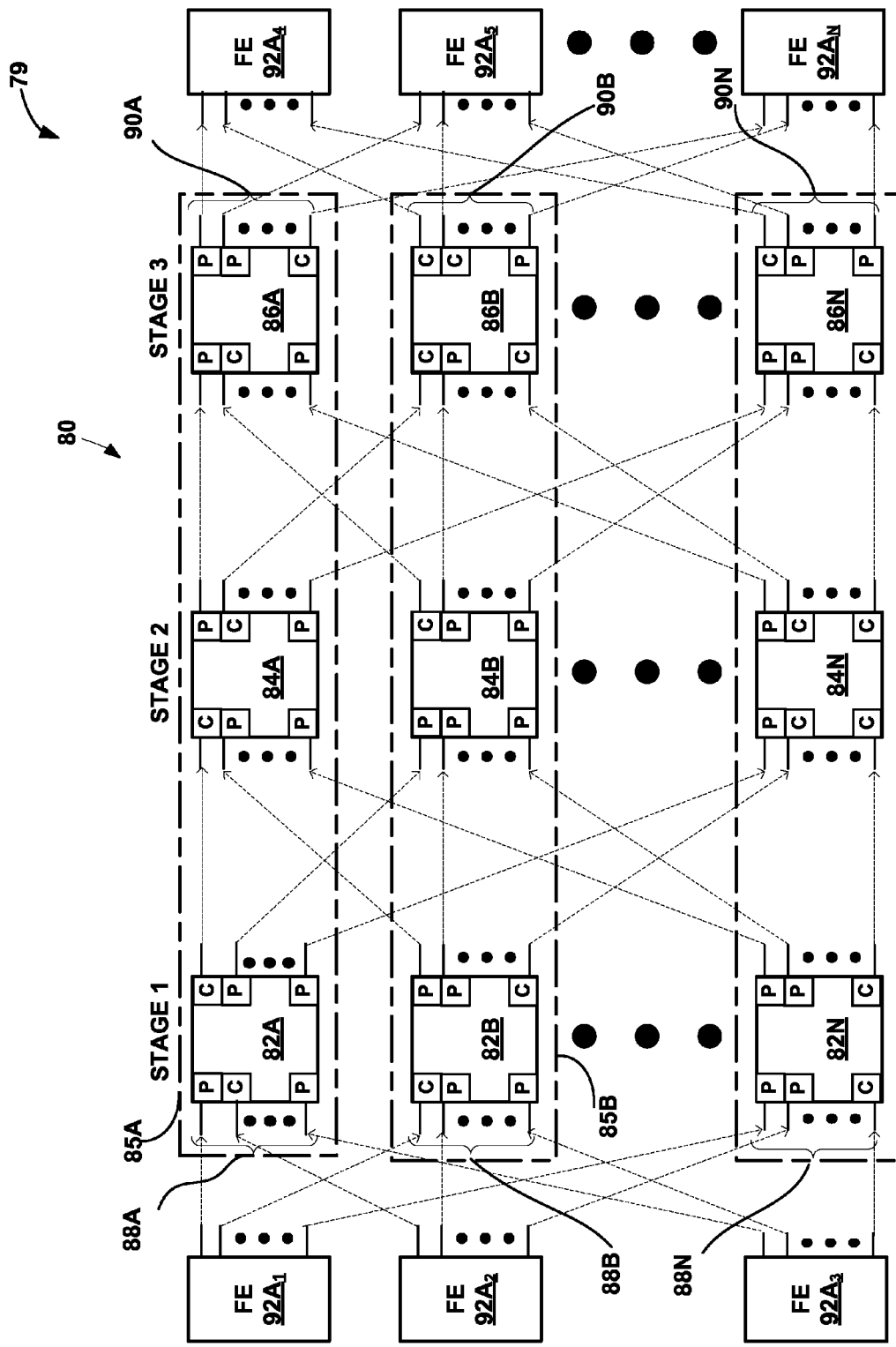
FIG. 8 is a logical representation of a system including an example multi-stage switch fabric that couples together a plurality of forwarding engines of a multi-chassis router.

FIG. 4 is a block diagram illustrating a conceptual diagram of a plurality of FEs coupled to a hybrid switch fabric 55 having a packet switching portion 56A and a circuit switching portion 56B. Hybrid switch fabric 55 may represent, for example, switch fabric 18 of routing node 10 (FIG. 2), or switch fabric 35 of multi-chassis router 28 (FIG. 3). While the packet switching portion 56A and the circuit switching portion 56B of hybrid switch fabric 55 are shown for purposes of illustration as separate, non-overlapping portions, as a practical matter the packet switching portion 56A and the circuit switching portion 56B may be integrated together on common fabric chips and distributed among multiple routing nodes, as illustrated in FIG. 8.

FEs 58A-58N ("FEs 58") are configured by a management daemon (e.g., management daemon 54) as "packet FEs," i.e., configured to receive and send packet-switched communications. Upon receiving a packet, an ingress FE 58, such as FE 58A, buffers and schedules the packets for transmission across hybrid switch fabric 55, segments the packet into cells, and transfers the cells into packet switching portion 56A of hybrid switch fabric 55. Packet switching portion 56A may include a plurality of fabric chips having ports specified for packet switching. The cells may be transmitted across multiple switch fabric stages within hybrid switch fabric to an egress FE 58, e.g., FE 58N, and may also be load balanced across different paths to the egress FE within packet switching portion 56A. FEs 58 and fabric chips within packet switching portion 56A may apply flow control to cells to deal with the flow of cells across the fabric chips.

FEs 59A-59N ("FEs 59") are configured by a management daemon as "circuit FEs," i.e., configured to receive and send circuit-switched communications. When a circuit connection is initially being established, a fabric controller (e.g., fabric controller 56) configures a dedicated path through circuit switching portion 56B from the ingress FE 59 to the egress FE 59. That is, a single cross-connect is dedicated for switching all of the data for that circuit connection. Upon receiving a circuit, an ingress FE 59, such as FE 59A, segments the data into cells, and transfers the cells into circuit switching portion 56B of hybrid switch fabric 55. Circuit switching portion 56B may include a plurality of fabric chips having ports specified for circuit switching. The cells may be transmitted across multiple switch fabric stages within hybrid switch fabric to an egress FE 59, e.g., FE 58C. The cells will each follow the pre-provisioned path through circuit switching portion 56B to the egress FE 58C.

Packet switching portion 56A of hybrid switch fabric 55 is configured to provide the performance required for packet switching, such as by allowing for load balancing, oversubscription, statistical multiplexing, variable length buffering and flow control, and other features that may be used for packet switching. Circuit switching portion 56B of hybrid switch fabric 55 is configured to provide the performance required for circuit switching, i.e., by providing dedicated bandwidth, pre-provisioned cross-connects, and other features. In this manner, hybrid switch fabric 55 acts like two separate switch fabrics, each with characteristics and features specific to the needs of its respective traffic type. Despite this behavior, hybrid switch fabric 55 physically comprises a single, shared hybrid switch fabric, and may include fabric chips that are used for transmitting both packet traffic and circuit traffic. The percentage of hybrid switch fabric 55 that comprises packet switching portion 56A and the percentage that comprises circuit switching portion 56B is easily configurable by an administrator, such as by using a management interface of the router.

FIG. 5 is a block diagram illustrating a detailed view of a fabric chip 60 that may be positioned within a switch fabric, such as within hybrid switch fabric 55 of FIG. 4, switch fabric 35 of FIG. 3, and switch fabric 18 of FIG. 2. Fabric chip 60 may comprise an integrated circuit (IC). Fabric chip 60 includes ports 66A-66N ("ports 66"), and links 68A-68N ("links 68"). Links 68 connect fabric chip 60 to other fabric chips within a switch fabric or to a FE. In accordance with the techniques described herein, each of ports 66 may be configurably designated as either "circuit ports" or "packet ports," as represented in FIG. 5 with "P" or a "C" in each port 66, and/or each of links 68 may be configurably designated as either "circuit links" or "packet links." Examples will be explained with respect to configuration performed in terms of fabric chip ports, although configuration in terms of fabric chip links may likewise be used.

Register 62 may be a programmable register that defines which of the ports 66 of fabric chip 60 are circuit ports and which are packet ports. Register 62 may be dynamically programmed by fabric controller 58 (FIG. 3) in the case of a multi-chassis router, or by a fabric controller executing within control unit 12 (FIG. 1) in the case of a single-chassis router. Upon receiving data units to be input into a switch fabric, FEs 20, 32 segment the received data units into fixed-size cells prior to inputting the cells into the switch fabric. At this time, the FEs will mark the cells as packet cells or circuit cells, e.g., by affixing a cell header that specifies whether the cell contains a segment of packet data or a segment of circuit data. The header may include other information, such as a destination FE of the packet, an identifier of the original data unit, and a sequence number.

When fabric chip 60 receives a cell at a port 68 on one of links 68, fabric chip 60 buffers the cell in buffer 65 and determines a port 68 to which to output the cell toward the destination specified in the cell header. In the example of FIG. 5, fabric chip 60 includes a bit map table 64. Bit map table 64 is a table that includes a bit map mapping each input port to one or more output ports on which it is permissible to output a cell received on the respective input port. Although the bit map of bit map table 64 is illustrated as a table, the bit map may be maintained in the form of one or more databases, link lists, radix trees, flat files, or any other data structures.

When a cell comes in, fabric chip directs the cell to an output port in accordance with bit map table 64. The fabric chip may perform flow control on packet ports, but typically does not perform flow control on circuit ports.

FIG. 6 is a block diagram illustrating register 62 of FIG. 5 in further detail. Register 62 may be a programmable register that defines which of the ports 66 of fabric chip 60 are circuit ports and which are packet ports. In the example of FIG. 6, register 62 includes a port column 70 and a circuit/packet column 72. Rows of register 62 include entries 74. A value of "0" in circuit/packet column 72 indicates that the corresponding port 66 is designated as a circuit port, and a value of "1" in circuit/packet column 72 indicates that the corresponding port 66 is designated as a packet port. In the example of FIG. 6, port 66A is designated as a circuit port, and circuit ports 66B and 66N are designated as packet ports.

Register 62 may be dynamically programmed by fabric controller 58 (FIG. 3) in the case of a multi-chassis router, or by a fabric controller executing within control unit 12 (FIG. 1) in the case of a single-chassis router. In this manner, an administrator may configure a router according to the techniques of this disclosure so as to define how many packet ports and how many circuit ports may be present within the switch fabric(s). The administrator may easily modify a proportion of circuit ports to packet ports, as needed. For example, the administrator may interact with management daemon 54 via CLI 52 to configure that the switch fabric(s) should have 60% packet ports and 40% circuit ports. Management daemon 54 may invoke fabric controller 58 to dynamically program register 62 to reflect the configuration by the administrator.

Although described for purposes of example in terms of two types of switching behaviors, i.e., packet switching and circuit switching, the techniques described herein may be used for managing a plurality of types of switching behaviors. For example, ports of fabric chip 60 may be configured for handling circuit-switched data, best-effort packet data, and circuit-like packet-switched data, e.g., Virtual Private Network (VPN) traffic.

FIG. 7 is a block diagram illustrating bit map table 64 of FIG. 5 in further detail. Bit map table 64 is a table that includes a bit map mapping each input port to one or more output ports on which it is permissible to output a cell received on the respective input port. In the example of FIG. 6, bit map table 64 includes an input port column 76 and an output port column 77. Rows of bit map table 64 include entries 78. As shown in FIG. 7, bit map table 64 includes an entry corresponding to port 66A. Port 66A is a circuit port, and is mapped to another circuit port, 66D. Port 66B is a packet port, and is mapped to several other packet ports, namely, ports 66C, 66E, and 66N. Port 66N is also a packet port, and is mapped to packet ports 66B, 66C, and 66E. The bit maps may be exclusive bit maps with no overlap.

Bit map table 64 is one example mechanism for virtualizing the switch fabric to handle both packet switching behavior and circuit switching behavior, but other mechanisms may be used. For example, rather than hard-coding each port of fabric chip 60 as either a packet port or a circuit port, each of ports 66 may be capable of handling both packet data or circuit data. An ingress port may be configured with two bit maps to apply that would tell which egress port on which to output a received cell depending on whether the cell is marked as a packet cell or a circuit cell. The ingress port selects one of the bit maps based on the marking of the cell, such that the cells are output on different ports depending on whether they are packet cells or circuit cells.

FIG. 8 is a block diagram illustrating system 79 including a logical representation of a three-stage switching network 80. Switching network 80 may logically represent a single hybrid switch fabric. For example, three-stage network 80 may logically represent switch fabric 18 of FIG. 2. As another example, the three stages of network 80 may logically represent a hybrid switch fabric 55 composed of switch fabric 35, components of which are distributed across the routing nodes of a multi-chassis router as represented by dashed lines 85A-85N ("routing nodes 85").

The three stages of network 80 include: stage 1 consisting of crossbar switches 82A-82N (collectively "switches 82"), stage 2 consisting of crossbar switches 84A-84N (collectively "switches 84"), and stage 3 consisting of crossbar switches 86A-86N (collectively "switches 86"). Switches 82, 84, and 84 may comprise fabric chips, such as fabric chip 60 of FIG. 5. Switches 82 receive data cells from FEs 92A$_{1-N}$ ("FEs 92A") via inputs 88A-88N (collectively "inputs 88"). Switches 86 relay the data cells via outputs 90A-90N (collectively "outputs 90"). As shown in FIG. 8, each stage of three-stage network 80 includes the same number of crossbar switches. In other embodiments, the stages may include a different number of crossbar switches. For example, stage 2 may include more crossbar switches than either stage 1 or stage 3 to reduce or eliminate the possibility that an open one of inputs 88 could be blocked from an open one of outputs 90. These extra crossbar switches in stage 2 may be located within switch fabric 35 or elsewhere.

Switching network 80 includes a packet switching portion and a circuit switching portion. As shown in FIG. 8, the packet switching portion and the circuit switching portion co-exist across each of the fabric chips 82. FEs 92A may be either a circuit FE or a packet FE, in that the FEs 92A are configured so as to receive either circuit traffic or packet traffic. FEs 92A are dynamically configurable such that the designation of circuit FE or packet FE may be changed by an administrator as needed. In some embodiments, a single FE may be configured to handle both packet traffic and circuit traffic. One of FEs 92A at an ingress line card receives a data unit. In some aspects, the FE 92A segments the data unit into fixed-size data cells, and marks the cells with an indication, e.g., in a cell header, of whether the cells are associated with circuit-switched data or with packet-switched data. Where the cells correspond to circuit-switched data, the FE 92A outputs the cells to a fabric chip, i.e., to one of switches 82, having input ports 88 designated for circuit-switched data. Where the cells correspond to packet-switched data, the FE 92A outputs the cells to one of switches 82 having input ports 88 designated for packet-switched data.

To establish a path through network 80 from one of inputs 88 to the required output 90, the one of switches 82 associated with the receiving input 88 determines an available stage 2 switch that allows a connection path to the stage 3 switch 86 including the required output 90. For example, assume a cell received by switch 82A is to be relayed to one of outputs 90A on switch 86A. Switch 82A selects any of switches 84 with an open connection to both switch 82A and switch 86A. Assume switch 82A selects switch 84B. Switch 82A sends a request to switch 84B requesting to send the cell. Switch 84B forwards the request along to switch 86A. If the request can be accommodated, switches 86A and 84B propagate a grant message back to switch 82A. Switch 82A then sends the cell along the reserved open path to switch 86A. In other aspects, each switch in network 80 may determine an available path for a cell on-the-fly.

In one example aspect, when a circuit connection is initially established through the router, the amount of requested bandwidth is pre-provisioned through the switch fabric along a path from the ingress FE to the egress FE. In this example, rather than load balancing the circuit cells across all of the active switch planes, the circuit cells for a particular connection are sent along a single pre-selected cross-connect between the ingress and egress FEs. Alternatively, in other example aspects, the circuit cells may be distributed across multiple paths toward the egress FE.

Switches 82, 84, 86 may perform flow control for packet cells, but may not perform flow control for circuit cells. In some aspects, switches 82, 84, 86 may perform flow control for circuit and packet cells.

In some aspects, the connections between stages may utilize optical multiplexing, and multiple paths originating from the same switch, e.g., the N−1 paths originating from switch 82A to stage 2 switches 84A-84N, represent N−1 channels defined by different wavelengths carried by the same optical interconnect. In this manner, a data cell received by a switch 82 in stage 1 may go through any of switches 84 in stage 2 to be received by the required switch 86 in stage 3.

In this manner, the switch fabric provided by three-stage switching network 80 accommodates a configurable virtualization of a virtual packet fabric and a virtual circuit fabric in a single switching network. Separate paths may be engineered across a common fabric for packet switching and circuit switching, and each port of a fabric chip within the fabric can be designated as a "packet port" or "circuit port." The packet ports and circuit ports may be treated differently, e.g., for purposes of flow control, multiplexing, and the like. The result is a common switch fabric that provides the functionality of multiple separate fabrics each having characteristics suitable for their respective tasks. The "circuit" portion of the fabric is protected from a surge in traffic in the "packet" portion of the fabric. For example, dedicated paths through the switch fabric are configured for circuit traffic, and no packet traffic will traverse these paths.

While the switch fabric is described as containing a three-stage switch network, in other embodiments switch fabric may contain different multi-stage switch architecture. For example, the second stage in a three-stage network may be replaced with another three-stage network, thereby forming a five-stage network. Other switch fabric architectures are also possible.

Figure 9:
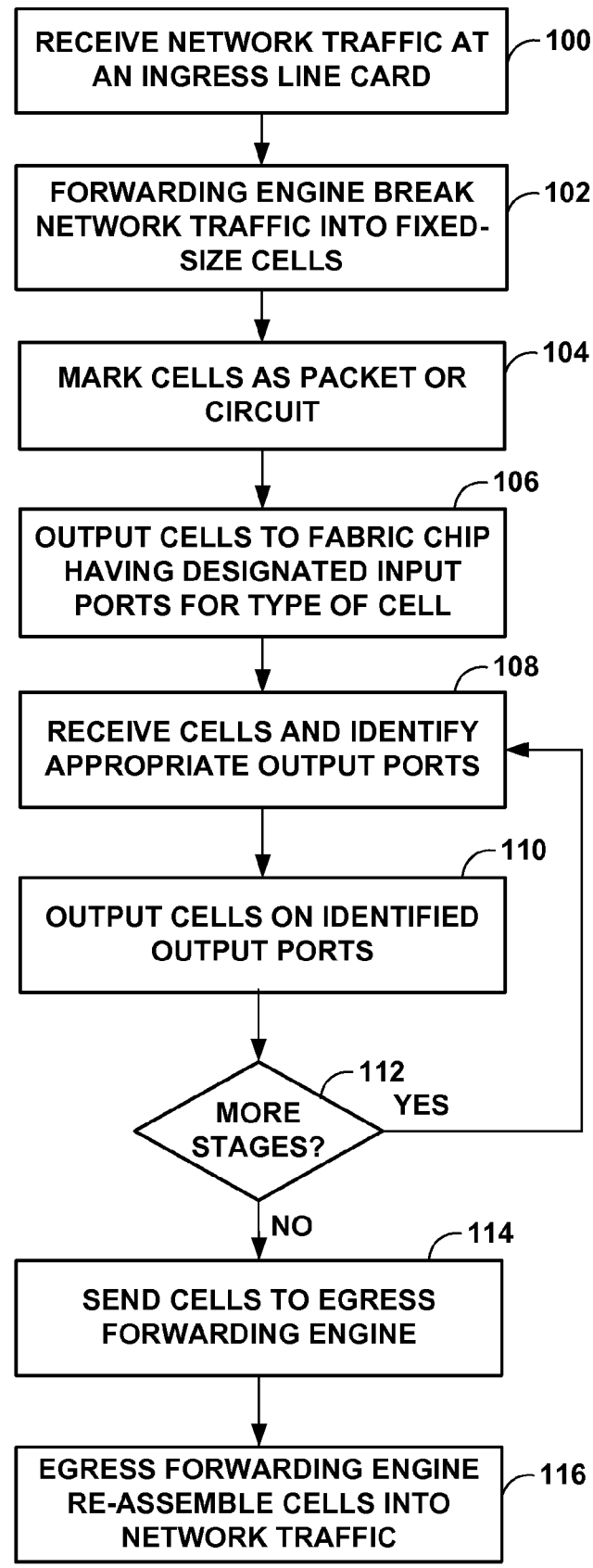
FIG. 9 is a flow chart illustrating example operation of a router in implementing the techniques described herein.

FIG. 9 is a flow chart illustrating example operation of a router in implementing the techniques described herein. FIG. 8 will be described for purposes of example with respect to FIGS. 4-8, in terms of a multi-chassis router. However, the steps of FIG. 9 could also be implemented by a single-chassis router. A router receives network traffic at an ingress line card (100). The FE 92A of the ingress line card segments the data units of the network traffic into fixed-size data cells (102), and marks the cells with an indication of whether the cells are associated with circuit-switched traffic or with a packet-switched traffic, e.g., in a cell header (104). The FE writes the cells into ingress memory of the FE. The FE then performs a forwarding lookup, determines a destination for the data unit, and transfers the cells of the data unit across the active switch planes. The FE then outputs the cells to a fabric chip (106). Where the cells correspond to a circuit, the FE 92A outputs the cells to a fabric chip, i.e., to one of switches 82, having input ports 88 designated for circuit data. Where the cells correspond to a packet, the FE 92A outputs the cells to one of switches 82 having input ports 88 designated for packet data.

The fabric chip receives the cells and identifies the appropriate ports on which the cells may be output (108). For example, the fabric chip may include a bit map table 64 that is populated based on a programmable register 62 that specifies which ports of the fabric chip are packet ports and which are circuit ports. The fabric chip may select an output port from among the permissible output ports based on the bit map table 64. The fabric chip then outputs the cells onto the identified output port (110). If there are more stages of the fabric to be crossed (112), the additional fabric chips receive the cells, determine the permitted output ports in accordance with the bit map, and output the cells accordingly. If there are no more stages to be crossed, the last fabric chip outputs the cells to the egress FE (114), which reassembles the cells into the original data units (116), and outputs the data units via an interface to the next hop. The egress FEs may reorder the cells if they are received out of order, e.g., using sequence numbers. In addition, the egress FEs may reorder reassembled packet data and circuit data, e.g., using synchronous optical network (SONET) mechanisms for circuits.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various embodiments of the invention have been described. These and other embodiments are within the scope of the following claims.

The invention claimed is:

1. A network device comprising:
a configurable hybrid switch fabric configured for switching packets and circuits, wherein the hybrid switch fabric comprises:
a packet switching portion that distributes packets across any of a plurality of packet ports of fabric chips within the hybrid switch fabric and operates in accordance with packet switching behavior requirements; and
a circuit switching portion for switching circuits that directly connects a single input of the hybrid switch fabric to a single output of the hybrid switch fabric via a pre-determined path through the fabric chips and operates in accordance with circuit switching behavior requirements,
wherein the packet switching portion and the circuit switching portion include one or more fabric chips, wherein the fabric chips each include a plurality of configurable ports that are each dynamically configurable as any one of a packet port for receiving and outputting packet-switched data and a circuit port for receiving and outputting circuit-switched data;
a fabric controller that programs the configurable ports of the fabric chips to specify whether the ports are packet ports or circuit ports, wherein the fabric controller is configured to program the configurable ports to change a proportion of packet ports and circuit ports responsive to receiving data input by an administrator; and a plurality of removable line cards communicatively coupled to the hybrid switch fabric, wherein the plurality of removable line cards comprise:

one or more packet line cards for inputting and outputting packet-switched data to and from the hybrid switch fabric; and one or more circuit line cards for inputting and outputting circuit switched data to and from the hybrid switch fabric.

2. The network device of claim 1, wherein the fabric chips of the hybrid switch fabric are each configured with a respective bit map that maps one input port to one or more output ports, wherein the mapping is updated by the fabric controller based on whether the ports of the fabric chip are configured as packet ports or circuit ports.

3. The network device of claim 1, further comprising a user interface, wherein the fabric controller programs the configurable ports based on configuration data input to the user interface by an administrator.

4. The network device of claim 1, wherein a signaling protocol is configured to program the configurable ports to change a proportion of packet ports and circuit ports responsive to receiving signaling information in accordance with the signaling protocol.

5. The network device of claim 4, wherein the signaling protocol comprises a Generalized Multiprotocol Label Switching (GMPLS) protocol.

6. The network device of claim 1, wherein forwarding engines associated with the packet line cards buffer received packet-switched data in variable-size buffers, and apply flow control processes when propagating the packet-switched data across the packet switching portion of the hybrid switch fabric.

7. The network device of claim 6, wherein the flow control processes comprise sending a fabric request to send the packet-switched data from an ingress forwarding engine of an ingress one of the plurality of packet line cards to an egress forwarding engine of an egress one of the plurality of packet line cards, and receiving a fabric reply at the ingress forwarding engine from the egress forwarding engine indicating whether the packet-switched data is allowed to be sent to the egress forwarding engine.

8. The network device of claim 1, wherein one or more forwarding engines associated with the circuit line cards are configured to bypass application of flow control for circuit-switched data.

9. The network device of claim 1, wherein one or more forwarding engines associated with the circuit line cards maintain fixed-size buffers for circuit-switched data, and output the circuit-switched data onto the circuit switching portion of the switch fabric at a constant bit rate.

10. The network device of claim 1, wherein one or more forwarding engines associated with the circuit line cards are configured to distribute circuit-switched data across any of a plurality of circuit ports of the fabric chips within the hybrid switch fabric.

11. The network device of claim 1, wherein the plurality of removable line cards comprises one or more hybrid line cards for inputting and outputting both packet-switched data and circuit-switched data on an interface-by-interface basis.

12. The network device of claim 1, wherein a forwarding engine of one of the plurality of removable line cards segments received packet-switched data or circuit-switched data into data cells, marks the cells with an indication of whether the cell is a packet cell or circuit cell prior to outputting the cells onto the hybrid switch fabric.

13. The network device of claim 1, wherein the network device comprises a single chassis router.

14. The network device of claim 1, wherein the network device comprises a multi-chassis router, further comprising:

a plurality of line card chassis, wherein each of the plurality of line card chassis includes a portion of the hybrid switch fabric; and a switch card chassis coupled to each of the plurality of line card chassis, wherein the switch card chassis includes a portion of the hybrid switch fabric.

15. The network device of claim 1, wherein the hybrid switch fabric comprises a multi-stage switch fabric.

16. The network device of claim 1, wherein the circuit switching portion of the hybrid switch fabric directly connects a plurality of inputs of the hybrid switch fabric to a plurality of outputs of the hybrid switch fabric via respective pre-determined paths through the fabric chips.

17. The network device of claim 1, wherein a signaling protocol designates one or more external links of the network device as circuit switched links, and wherein the network device determines a number of configurable ports of the fabric chips to configure as circuit switched ports to support an amount of bandwidth required by the external links designated as circuit switched links, wherein the fabric controller is configured to program the configurable ports of the fabric chips to specify whether the ports are packet ports or circuit ports based at least in part on the determination.

18. A method comprising:

receiving packet-switched data at first one of a plurality of removable line cards of a network device, wherein the first one of the plurality of removable line cards is designated as a packet line card for inputting and outputting packet-switched data to and from a configurable hybrid switch fabric of the network device;

receiving circuit-switched data at second one of the plurality of removable line cards of the network device, wherein the second one of the plurality of removable line cards is designated as a circuit line card for inputting and outputting circuit-switched data to and from the hybrid switch fabric;

sending the packet-switched data across a packet switching portion of the hybrid switch fabric, wherein the packet switching portion distributes packets across any of a plurality of packet ports of fabric chips within the hybrid switch fabric and operates in accordance with packet switching behavior requirements;

sending the circuit-switched data across a circuit switching portion of the hybrid switch fabric, wherein the circuit switching portion of the hybrid switch fabric directly connects a single input of the hybrid switch fabric to a single output of the hybrid switch fabric via a pre-determined path through the fabric chips and operates in accordance with circuit switching behavior requirements; and programming, with a fabric controller of the network device, the configurable ports of the fabric chips to specify whether the ports are packet ports or circuit ports, wherein the fabric controller is configured to program the configurable ports to change a proportion of packet ports and circuit ports responsive to receiving data input by an administrator, wherein the packet switching portion and the circuit switching portion include one or more fabric chips, wherein the fabric chips each include a plurality of configurable ports that are each dynamically configurable as one of a packet port for receiving and outputting packet-switched data and a circuit port for receiving and outputting circuit-switched data, and wherein the plurality of removable line cards are communicatively coupled to the hybrid switch fabric.

19. The method of claim 18, wherein the fabric chips of the hybrid switch fabric are each configured with a respective bit map that maps one input port to one or more output ports, further comprising updating the bit map with the fabric controller based on whether the ports of the fabric chip are configured as packet ports or circuit ports.

20. The method of claim 18, wherein the fabric controller programs the configurable ports based on configuration data input to a user interface by the administrator.

21. The method claim 18, wherein the fabric controller is configured to program the configurable ports to change a proportion of packet ports and circuit ports responsive to receiving configuration data by a signaling protocol.

22. The method of claim 21, wherein the signaling protocol comprises a Generalized Multiprotocol Label Switching (GMPLS) protocol.

23. The method of claim 18, further comprising:

buffering the received packet-switched data in variable-size buffers, and applying flow control processes when propagating the packet-switched data across the packet switching portion of the hybrid switch fabric.

24. The method of claim 23, wherein applying flow control processes comprises:

sending a fabric request to send the packet-switched data from an ingress forwarding engine of an ingress one of a plurality of packet line cards to an egress forwarding engine of an egress one of the plurality of packet line cards; and receiving a fabric reply at the ingress forwarding engine from the egress forwarding engine indicating whether the packet-switched data is allowed to be sent to the egress forwarding engine.

25. The method of claim 23, further comprising:

maintaining fixed-size buffers for the received circuit-switched data, and outputting the circuit-switched data onto the circuit switching portion of the switch fabric at a constant bit rate.

26. The method of claim 18, further comprising:

bypassing application of flow control for circuit-switched data.

27. The method of claim 18, wherein the circuit switching portion of the hybrid switch fabric directly connects a plurality of inputs of the hybrid switch fabric to a plurality of outputs of the hybrid switch fabric via respective pre-determined paths through the fabric chips.

28. The method of claim 18, further comprising distributing the circuit-switched data across any of a plurality of circuit ports of the fabric chips within the hybrid switch fabric.

29. The method of claim 18, further comprising:

receiving, by a signaling protocol, a communication to designate one or more one or more external links of the network device as circuit switched links;

determining a number of configurable ports of the fabric chips to configure as circuit switched ports to support an amount of bandwidth required by the external links designated as circuit switched links; and wherein the fabric controller is configured to program the configurable ports of the fabric chips to specify whether the ports are packet ports or circuit ports based at least in part on the determination.

30. A non-transitory computer-readable storage medium comprising instructions for causing a programmable processor to:

receive packet-switched data at first one of a plurality of removable line cards of a network device, wherein the first one of the plurality of removable line cards is designated as a packet line card for inputting and outputting packet-switched data to and from a configurable hybrid switch fabric of the network device;

receive circuit-switched data at second one of the plurality of removable line cards of the network device, wherein the second one of the plurality of removable line cards is designated as a circuit line card for inputting and outputting circuit-switched data to and from the hybrid switch fabric;

send the packet-switched data across a packet switching portion of the hybrid switch fabric, wherein the packet switching portion distributes packets across any of a plurality of packet ports of fabric chips within the hybrid switch fabric and operates in accordance with packet switching behavior requirements;

send the circuit-switched data across a circuit switching portion of the hybrid switch fabric, wherein the circuit switching portion of the hybrid switch fabric directly connects a single input of the hybrid switch fabric to a single output of the hybrid switch fabric via a pre-determined path through the fabric chips and operates in accordance with circuit switching behavior requirements; and programming, with a fabric controller of the network device, the configurable ports of the fabric chips to specify whether the ports are packet ports or circuit ports, wherein the fabric controller is configured to program the configurable ports to change a proportion of packet ports and circuit ports responsive to receiving data input by an administrator, wherein the packet switching portion and the circuit switching portion include one or more fabric chips, wherein the fabric chips each include a plurality of configurable ports that are each dynamically configurable as one of a packet port for receiving and outputting packet-switched data and a circuit port for receiving and outputting circuit-switched data, wherein the plurality of removable line cards are communicatively coupled to the hybrid switch fabric.

* * * * *